United States Patent
Tange (12) 
(10) Patent No.: US 6,436,566 B1
(45) Date of Patent: Aug. 20, 2002

(54) FUEL CELL AND POLYMER ELECTROLYTE MEMBRANE

(75) Inventor: Kyoichi Tange, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 100 days.

(21) Appl. No.: 09/606,284

(22) Filed: Jun. 29, 2000

(30) Foreign Application Priority Data

Jul. 2, 1999 (JP) .......................................... 11-188665

(51) Int. Cl.[7] ............................................... H01M 8/10
(52) U.S. Cl. ........................................... 429/33; 429/30
(58) Field of Search ..................................... 429/30, 33

(56) References Cited

U.S. PATENT DOCUMENTS

| | | | | |
|---|---|---|---|---|
| 5,607,785 A | * | 3/1997 | Tozawa et al. | 429/33 |
| 5,672,438 A | * | 9/1997 | Banerjee et al. | 429/33 |
| 5,846,669 A | | 12/1998 | Smotkin et al. | 429/41 |
| 5,981,097 A | * | 11/1999 | Rajendran | 429/33 |

FOREIGN PATENT DOCUMENTS

| | | |
|---|---|---|
| DE | 198 54 728 A1 | 7/1999 |
| JP | 6-231781 | 8/1994 |
| JP | 7-135004 | 5/1995 |
| JP | 8-171920 | 7/1996 |

* cited by examiner

*Primary Examiner*—Stephen Kalafut
(74) *Attorney, Agent, or Firm*—Kenyon & Kenyon (57) ABSTRACT

A fuel cells stack of the present invention includes a plurality of unit cells, which are laid one upon another. Each unit cell has a hydrogen electrode and an oxygen electrode, which are disposed across an electrolyte membrane. The electrolyte membrane is a hydrogen ion exchange membrane, which is mainly composed of a sulfonic acid group-containing perfluorocarbon polymer. The electrolyte membrane is designed to have a varying concentration of sulfonic acid group in such a manner that the concentration of sulfonic acid group in a contact area, where the electrolyte membrane is in contact with the hydrogen electrode, is approximately one tenth of the concentration of sulfonic acid group in a residual area. The electromotive force of the unit cell varies according to a difference in hydrogen ion concentration between the hydrogen electrode and the oxygen electrode. The varying concentration of sulfonic acid group enables the hydrogen ion concentration in the contact area, where the electrolyte membrane is in contact with the hydrogen electrode, to be lower than the hydrogen ion concentration in an opposite contact area, where the electrolyte membrane is in contact with the oxygen electrode, on an occasion of power generation. This arrangement desirably enhances the electromotive force per unit cell.

12 Claims, 6 Drawing Sheets

FUEL CELL AND POLYMER ELECTROLYTE MEMBRANE

BACKGROUND OF THE INVENTION

1. Field of the Invention

The present invention relates to a fuel cell including a hydrogen electrode and an oxygen electrode disposed across an electrolyte layer, which hydrogen ion permeates, as well as a polymer electrolyte membrane that forms an electrolyte layer of a polymer electrolyte fuel cell.

2. Description of the Related Art

Fuel cells generally have a hydrogen electrode and an oxygen electrode disposed across an electrolyte layer, which hydrogen ion permeates. In the fuel cells, reactions expressed by Equations (1) and (2) given below proceed respectively on an anode (hydrogen electrode) and a cathode (oxygen electrode).

Anode (Hydrogen Electrode)

$$H_2 \rightarrow 2H^+ + 2e \quad (1)$$

Cathode (Oxygen Electrode)

$$(\tfrac{1}{2})O_2 + 2H^+ + 2e \rightarrow H_2O \quad (2)$$

The hydrogen ion produced on the hydrogen electrode is hydrated to form hydroxonium ion $(xH_2O)H^+$ and shifts to the oxygen electrode through the electrolyte layer.

A diversity of fuel cells with various electrolyte layers have been proposed: phosphoric acid fuel cells, molten carbonate fuel cells, solid oxide fuel cells, and alkali fuel cells. Much attention has been drawn to polymer electrolyte fuel cells using a hydrogen ion-conductive polymer membrane as the electrolyte layer, because of the potential for high output density and size reduction. Various techniques have been studied to improve the properties of such fuel cells.

The fuel cells with any electrolyte layers generate electricity, based on the above principle. The theoretical electromotive force, that is, the theoretical potential difference between the hydrogen electrode and the oxygen electrode, is approximately 1.23 V. In the actual conditions, the output voltage is lowered to approximately 0.95 to 1 V, due to a variety of losses. One of the main factors to decrease the output voltage is the internal resistance, that is, the resistance caused by the low mobility of hydrogen ions in the electrolyte layer.

A diversity of techniques have been proposed to reduce the internal resistance in the polymer electrolyte fuel cells; for example, the techniques disclosed in JAPANESE PATENT LAID-OPEN GAZETTE No. 6-231781, No. 8-171920, and No. 7-135004. The techniques disclosed in the former two applications vary the water content of the polymer electrolyte membrane formed as the electrolyte layer in such a manner that the water content on the side of the hydrogen electrode is higher than the water content on the side of the oxygen electrode. As mentioned previously, the hydrogen ions are hydrated or combined with water molecules to form the hydroxonium ions, while shifting through the electrolyte layer. With a progress in reaction, water molecules become insufficient on the side of the hydrogen electrode that supplies the hydrogen ions, while becoming excess on the side of the oxygen electrode. The proposed techniques give a difference in water content between the two electrodes, so as to cancel the shortage of water molecules and facilitate the smooth shift of the hydrogen ions.

The technique disclosed in JAPANESE PATENT LAID-OPEN GAZETTE No. 7-135004 increases the concentration of the ion exchange group contained in the electrolyte layer. The hydrogen ions and the hydroxonium ions shift through the electrolyte layer with the aide of the ion exchange groups. The increase in concentration of the ion exchange group accordingly decreases the internal resistance. JAPANESE PATENT LAID-OPEN GAZETTE No. 7-135004 also discloses the technique that makes the concentration of the ion exchange group on the side of the hydrogen electrode higher than that on the side of the oxygen electrode. The higher concentration of the ion exchange group generally improves the water absorption capacity. The higher concentration of the ion exchange group on the side of the hydrogen electrode than that on the side of the oxygen electrode accordingly increases the water content on the side of the hydrogen electrode. This ensures the similar effects to those attained by the techniques disclosed in JAPANESE PATENT LAID-OPEN GAZETTE No. 6-231781 and No. 8-171920 described above.

These proposed techniques aim to reduce the internal resistance to improve operation efficiency of the fuel cells, but not to enhance the electromotive force of the fuel cells. The reduction of the internal resistance slightly enhances the output voltage. But the improved level still remains at about 1 V against the theoretical, maximum electromotive force of approximately 1.23 V.

In the event that fuel cells are used as the power source of various apparatuses, the fuel cells are expected to output the required voltage according to each apparatus. The low electromotive force per unit cell causes an increase in the number of unit cells connected to output the required voltage. The greater number of unit cells undesirably makes the whole power source system bulky and increases the manufacturing cost. From this point of view, the enhancement of the electromotive force of the fuel cells is very important. The proposed techniques have been mainly directed to the reduction of the internal resistance to improve the operation efficiency, but there has been no fully discussion on the enhancement of the electromotive force.

These problems arise not only in polymer electrolyte fuel cells but in other types of fuel cells.

SUMMARY OF THE INVENTION

An object of the present invention is thus to provide a technique that enhances electromotive force of a fuel cell.

Another object of the invention is to provide an electrolyte membrane that is applied for a polymer electrolyte fuel cell having an enhanced electromotive force.

At least part of the above and the other related objects is attained by a fuel cell including a hydrogen electrode and an oxygen electrode disposed across an electrolyte layer, which hydrogen ion permeates. The electrolyte layer has a first contact area, where the electrolyte layer is in contact with the oxygen electrode, and a second contact area, where the electrolyte layer is in contact with the hydrogen electrode. The hydrogen ion concentration in the first contact area is higher than the hydrogen ion concentration in the second contact area. It is preferable that the difference of the ion concentration is a predetermined value corresponding to a target electromotive force on an occasion of power generation.

The fuel cell of this arrangement has the enhanced electromotive force, due to the difference in hydrogen ion concentration between the side of the hydrogen electrode and the side of the oxygen electrode. The fuel cell of the present invention is preferably used as the unit cell of a power source system. This desirably decreases the required number of unit cells to output the required voltage, thereby reducing the size and the manufacturing cost of the whole power source system.

The following describes the relationship between the variation in hydrogen ion concentration and the electromotive force. The electromotive force of the fuel cell represents the potential difference between the hydrogen electrode and the oxygen electrode. The reactions expressed by Equations (1) and (2) given above proceed on the respective electrodes. The reactions occurring at the respective electrodes are in an equilibrium state in the process of power generation. The potentials at the respective electrodes in the equilibrium state are generally expressed by the Nernst equation. According to the Nernst equation, the equilibrium electrode potential $E_H$ at the hydrogen electrode and the equilibrium electrode potential $E_O$ at the oxygen electrode are expressed respectively by Equations (3) and (4) given below.

$$E_H = E_{HO} + (RT/F) \times \ln(aH) \quad (3)$$
$$= E_{HO} - (RT/F) \times pH$$

$$E_O = E_{OO} + (RT/F) \times \ln(aH) \quad (4)$$
$$= E_{OO} - (RT/F) \times pH$$

where R denotes the gas constant, T denotes the absolute temperature or Kelvin temperature, F denotes the Faraday constant, aH denotes the activity of hydrogen ion, $E_{HO}$ represents the potential (0 V) at the hydrogen electrode under the condition of aH=1, $E_{OO}$ represents the potential (1.23 V) at the oxygen electrode under the condition of aH=1, and pH (hydrogen ion exponent) is equal to –ln(aH).

The activity of hydrogen ion aH is not strictly identical with the hydrogen ion concentration in some cases. In the specification hereof, however, it is assumed that the activity of hydrogen ion aH is identical with the hydrogen ion concentration.

Figure 1:
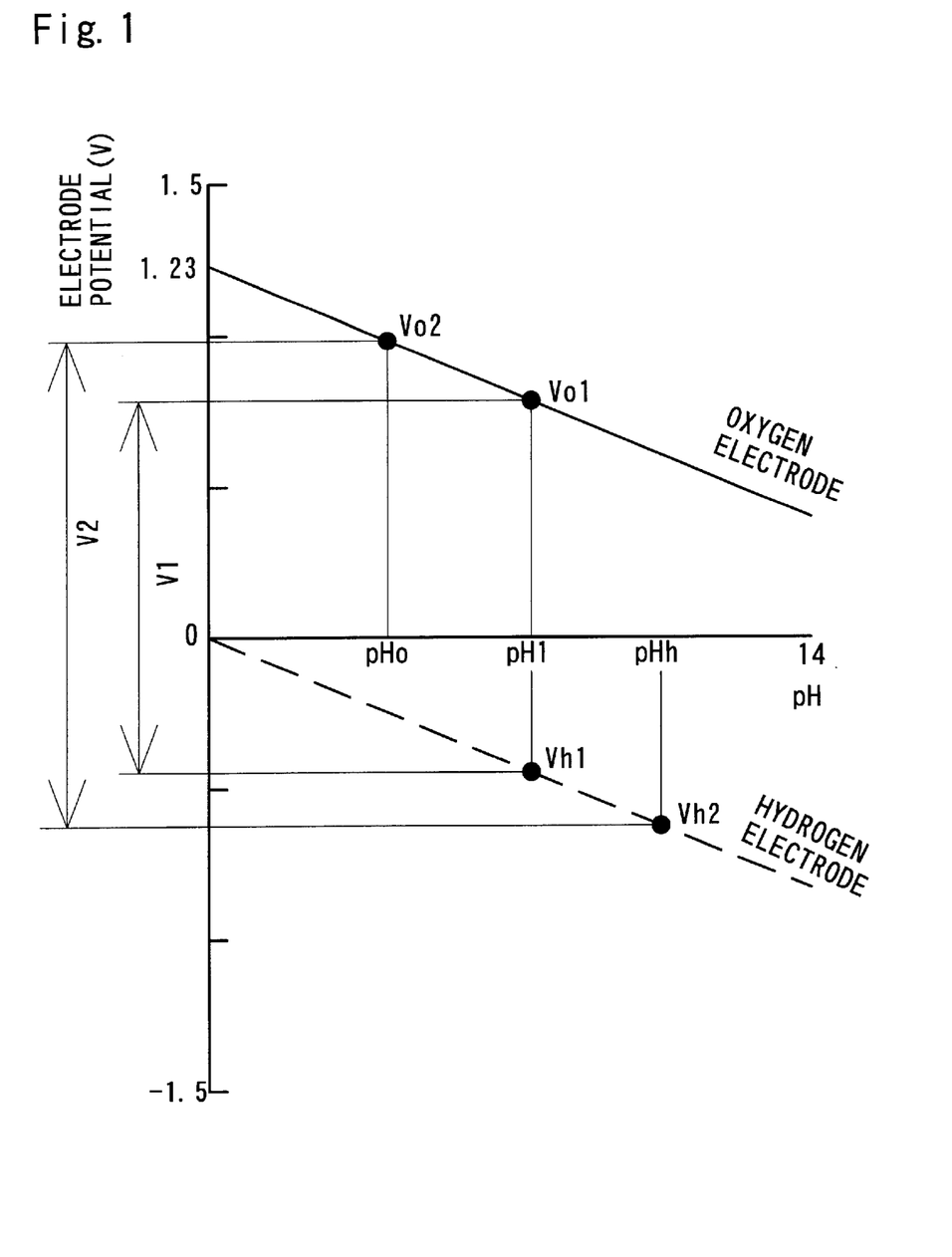
FIG. 1 is a graph showing variations in equilibrium electrode potentials at the hydrogen electrode and the oxygen electrode plotted against the pH value.

FIG. 1 is a graph showing variations in equilibrium electrode potentials at the hydrogen electrode and the oxygen electrode plotted against the pH value. Namely this graph represents Equations (3) and (4) given above according to Nernst equation. The solid line represents a variation in equilibrium electrode potential at the oxygen electrode, whereas the broken line represents a variation in equilibrium electrode potential at the hydrogen electrode. As shown in the graph of FIG. 1, each electrode potential decreases with a decrease in hydrogen ion concentration. The potential difference between the two electrodes is fixed to 1.23V at each pH value, as clearly understood from Equations (3) and (4). For example, when the electrolyte layer has pH=1, the electrode potential at the oxygen electrode is equal to Vo1 and the electrode potential at the hydrogen electrode is equal to Vh1. The electromotive force of the fuel cell at this point corresponds to the potential difference between the hydrogen electrode and the oxygen electrode, that is, a voltage V1, and is theoretically equal to 1.23 V. As far as the electrolyte layer has a homogeneous composition on both the sides of the hydrogen electrode and the oxygen electrode, the theoretical value of the electromotive force is 1.23 V, irrespective of the pH of the electrolyte layer.

The fuel cell of the present invention has the difference in hydrogen ion concentration, that is, pH (hydrogen ion exponent), between the part of the electrolyte layer close to the oxygen electrode and the part of the electrolyte layer close to the hydrogen electrode. The hydrogen ion concentration on the side of the hydrogen electrode is lower than that on the side of the oxygen electrode. One example of this state is shown in FIG. 1. In the fuel cell of the present invention, for example, when the pH on the side of the oxygen electrode is equal to pHo, the pH on the side of the hydrogen electrode is equal to pHh, which is higher than pHo. The electrode potential at the oxygen electrode is accordingly equal to Vo2, and the electrode potential at the hydrogen electrode is equal to Vh2. The electromotive force of the fuel cell corresponds to the potential difference between the two electrodes, that is, a voltage V2. As clearly understood from the graph of FIG. 1 and Equations (3) and (4), the voltage V2 is greater than 1.23 V. The electromotive force varies according to the pH difference between the side of the oxygen electrode and the side of the hydrogen electrode.

In the conventional fuel cells, a common electrolyte layer is used for the hydrogen electrode and the oxygen electrode. As described previously, the proposed technique simply gives a difference in water content between the side of the hydrogen electrode and the side of the oxygen electrode, in order to improve the hydrogen ion conductivity. The inventors of the present invention have given a preference to the enhanced electromotive force of the fuel cell, based on the principle of power generation of the fuel cell. The inventors have then given the attention to the relationship expressed by Nernst equation, that is, the relationship between the pH value of the electrolyte layer and the potentials at the respective electrodes, and completed the invention, based on the finding that the variation in pH value between the two electrodes enhances the electromotive force of the fuel cell. The Nernst equation itself is well known in the art. The technical significance of the present invention is that the Nernst equation is reexamined with a view to enhancing the electromotive force of the fuel cell and that the difference in pH between the part of the electrolyte layer close to the hydrogen electrode and the part of the electrolyte layer close to the oxygen electrode leads to the enhancement of the electromotive force.

As clearly understood from the graph of FIG. 1 and Equations (3) and (4), the technique of the present invention sets the difference between the pH value on the side of the hydrogen electrode and the pH value on the side of the oxygen electrode according to the target electromotive force. The graph of FIG. 1 shows the theoretical values. In the actual state, the difference between the pH values on the sides of the two electrodes is set while taking into account the voltage drop due to a variety of losses. The technique of the present invention is based on the finding that the equilibrium state of the reactions proceeding on the hydrogen electrode and the oxygen electrode varies with a variation in pH of the electrolyte layer. The hydrogen ion concentration of the electrolyte layer is accordingly required to have a variation in contact areas, where the electrolyte layer is in contact with the respective electrodes, and more strictly in regions affecting the equilibrium state of the reactions proceeding on the respective electrodes. The hydrogen ion concentration of the electrolyte layer may be increased gradually from the side of the hydrogen electrode to the side of the oxygen electrode. As far as the above conditions are fulfilled, any value may be set to the hydrogen ion concentration in the electrolyte layer.

The technique of the present invention is applicable to a variety of fuel cells, such as phosphoric acid fuel cells and molten carbonate fuel cells. It is, however, especially preferable that the electrolyte layer is a hydrogen ion exchange membrane, which is mainly composed of a solid polymer. Namely the technique of the present invention is preferably applied to polymer electrolyte fuel cells.

The polymer electrolyte fuel cell has an electrolyte layer composed of a polymer membrane. No discussion has been made to adopt the technique of varying the composition of the electrolyte layer between the two electrodes. The inventors have overthrown the conventional idea and clarified the importance of the varying composition of the electrolyte layer between the two electrode. This is the significance of the present invention. It is relatively easy to vary the composition of the electrolyte layer between the two electrodes, since the electrolyte layer is composed of a polymer membrane. The polymer electrolyte membrane advantageously maintains the difference between the pH value on the side of the hydrogen electrode and the pH value on the side of the oxygen electrode over a relatively long time.

The difference in pH value between the side of the hydrogen electrode and the side of the oxygen electrode may be attained by a variety of arrangements.

In accordance with one preferable embodiment, the electrolyte layer has a varying concentration of an ion exchange group for the hydrogen ions in such a manner that the concentration of the ion exchange group in the first contact area, where the electrolyte layer is in contact with the oxygen electrode, is higher than that in the second contact area, where the electrolyte layer is in contact with the hydrogen electrode.

The hydrogen ion generally shifts from the hydrogen electrode to the oxygen electrode by the function of the ion exchange group. As is known in the art, the hydrogen ion concentration depends upon the concentration of the ion exchange group, and a greater number of hydrogen ions are present in the area including a greater number of ion exchange groups. In the fuel cell of the above arrangement, the first contact area, where the electrolyte layer is in contact with the oxygen electrode, has a higher concentration of the ion exchange group. This makes the hydrogen ion concentration on the side of the oxygen electrode higher than that on the side of the hydrogen electrode. This enhances the electromotive force. The concentration of the ion exchange group is set arbitrarily as far as the relationship between the two electrodes satisfies the above condition. The concentration of the ion exchange group on the side of the hydrogen electrode may be decreased, or alternatively the concentration on the side of the oxygen electrode may be increased. The difference in concentration of the ion exchange group between the respective electrodes is set according to the target electromotive force. The varying concentration of the ion exchange group may be attained by different quantities of the ion exchange group to be contained in the sides of the respective electrodes in the course of preparing the membrane of the electrolyte layer. The varying concentration may alternatively be attained by joining a pair of polymer membranes having different concentrations of the ion exchange group with each other.

In a concrete example of this arrangement, the electrolyte layer is a hydrogen ion exchange membrane, which is mainly composed of a sulfonic acid group-containing perfluorocarbon polymer, and the ion exchange group is sulfonic acid group. The ion exchange group is, of course, not restricted to the sulfonic acid group, but a diversity of other groups, for example, phosphoric acid group, may be applied for the ion exchange group.

This arrangement is generally applied for the polymer electrolyte fuel cell and is known so far as the preferable materials for the polymer electrolyte fuel cell having the excellent driving efficiency and durability. The combination of this arrangement with the technique of the present invention gives the fuel cell having the enhanced electromotive force, in addition to the variety of conventionally improved properties. In the fuel cell having this arrangement, varying the concentration of the sulfonic acid group in a region of not greater than 1 $\mu$m relative to the electrolyte layer having the thickness of several tens micrometer ensures the sufficient effects. Setting the concentration ratio of the sulfonic acid group of the side of the hydrogen electrode to the side of the hydrogen electrode equal to approximately 1 to 10 enhances the electromotive force by 20 to 50 mV. The concentration ratio may be set arbitrarily according to the target electromotive force.

In accordance with another preferable embodiment, the technique of the present invention is applied for the polymer electrolyte fuel cell. The electrolyte layer contains a non-proton cation, in such a manner that concentration of the non-proton cation in the vicinity of the second contact area, where the electrolyte layer is in contact with the hydrogen electrode, is higher than that in the vicinity of the first contact area, where the electrolyte layer is in contact with the oxygen electrode.

In the fuel cell of this arrangement, the Coulomb force between the non-proton cation and the hydrogen ion functions as the repulsive force on the side of the hydrogen electrode. The repulsive force works to keep the hydrogen ions away from the hydrogen electrode. This causes the hydrogen ion concentration to be lowered on the side of the hydrogen electrode and thereby enhances the electromotive force of the fuel cell. A diversity of non-proton cations may be contained in the electrolyte layer; for example, sodium ion ($Na^+$), potassium ion ($K^+$), calcium ion ($Ca^{2+}$), and silver ion ($Ag^+$). The techniques generally adopted in the process of forming a catalyst layer on the electrode may be applied to make the cations contained in the electrolyte layer. One applicable method impregnates the electrolyte layer with a solution containing a salt of the cation and removing only the non-required anion in an environment of high temperatures.

The technique of the present invention may be attained by an arrangement outside the electrolyte layer, in place of the above arrangement in the electrolyte layer.

The present invention is accordingly directed to a fuel cell including a hydrogen electrode and an oxygen electrode disposed across an electrolyte layer, which hydrogen ion permeates. The fuel cell further has enhancement element that increases a hydrogen ion concentration with the electrode layer during power generation in such a manner that the hydrogen ion concentration in a first contact area, where the electrolyte layer is in contact with the oxygen electrode, is higher than the hydrogen ion concentration in a second contact area, where the electrolyte layer is in contact with the hydrogen electrode, by at least a predetermined value corresponding to a target electromotive force.

In the fuel cell of this arrangement, the enhancement element causes a difference in hydrogen ion concentration between the first contact area close to the oxygen electrode and the second contact area close to the hydrogen electrode. The difference in hydrogen ion concentration desirably enhances the electromotive force. A diversity of techniques may be applied for the enhancement element. For example, the electrical field may be applied to induce or repel the hydrogen ion. In another example, surface treatment of the electrolyte layer with chemicals may be performed to cause the difference in hydrogen ion concentration. This arrangement advantageously allows the use of the electrolyte layer having the conventional structure and enhances the electromotive force by a relatively simple process.

In accordance with one concrete embodiment of the fuel cell having the characteristics outside the electrolyte layer, the electrolyte layer is a hydrogen ion exchange membrane, which is mainly composed of a solid polymer. At least one of the hydrogen electrode and the oxygen electrode has a specific structure that is partly in contact with the electrolyte layer. The enhancement element causes a difference in hydrogen ion conductivity between a contact region in the electrolyte layer, where the at least one electrode having the specific structure is in contact with the electrolyte layer, and a non-contact region.

The hydrogen ion conductivity is an index representing the ease of the movement of hydrogen ion. The higher conductivity represents the lower resistance to the movement of hydrogen ion. In the fuel cell of the above arrangement, there is a difference in hydrogen ion conductivity between the contact region of the electrolyte layer that is in contact with the electrode and the non-contact region. This leads to a difference in distribution of the hydrogen ion between the contact region and the non-contact region. For example, the hydrogen ion conductivity is raised in the contact region, where the electrolyte layer is in contact with the oxygen electrode, and lowered in the non-contact region. This makes a dense distribution of hydrogen ion shifted to the oxygen electrode in the contact region. The electrode reaction actually proceeds in the contact area. The variation in distribution of hydrogen ion accordingly has the similar effects as the increased hydrogen ion concentration in the contact area close to the oxygen electrode. On the contrary, the hydrogen ion conductivity may be raised in the non-contact region and lowered in the contact region, where the electrolyte layer is in contact with the hydrogen electrode. In this case, the non-contact region has a dense distribution of hydrogen ion produced at the hydrogen electrode. This has the similar effects as the decreased hydrogen ion concentration in the contact area close to the hydrogen electrode. The fuel cell of the above arrangement accordingly causes a difference in hydrogen ion concentration between the contact region and the non-contact region. This arrangement thus enhances the electromotive force, like the arrangement of varying the hydrogen ion concentration between the electrodes.

A diversity of techniques may be applied to cause a difference in hydrogen ion conductivity between the contact region and the non-contact region.

In accordance with one preferable embodiment, the oxygen electrode has the specific structure that is partly in contact with the electrolyte layer, and the enhancement element is a water repellent layer provided on surface of the non-contact region in the electrolyte layer.

The hydrogen ion is generally hydrated or combined with water molecules to form hydroxonium ion, when shifting through the electrolyte layer. The presence of water molecules thus significantly affects the hydrogen ion conductivity. The water repellent layer provided in the non-contact region close to the oxygen electrode keeps the water molecules away from the non-contact region and thereby reduces the number of water molecules existing in the non-contact region. The water molecules kept away from the non-contact region naturally concentrate in the contact region. The greater number of water molecules in the vicinity of the contact region enhances the hydrogen ion conductivity in the contact region, whereas the non-contact region has the lowered hydrogen ion conductivity.

A water repellent layer provided in the contact region close to the hydrogen electrode, where the hydrogen electrode is in contact with the electrolyte layer, has the same effects as those of the above arrangement. Similar effects are also expected by providing a hydrophilic layer in the contact region close to the oxygen electrode or in the non-contact region close to the hydrogen electrode. Among these substantially equivalent arrangements, the water repellent layer is readily formed in the non-contact area of the electrolyte layer close to the oxygen electrode. In this arrangement, the water repellent layer is obtained by simply applying a fluoro compound on the surface of the electrolyte layer or coating the surface with a fluoro compound. Another advantage is that the water repellent layer does not interfere with the electrode reaction in the contact region.

In the fuel cell of the present invention, it is preferable that the first contact area, where the electrolyte layer is in contact with the oxygen electrode, is narrower than the second contact area, where the electrolyte layer is in contact with the hydrogen electrode.

The reaction on each electrode actually proceeds in the contact area, where the electrolyte layer is in contact with the electrode. The narrow contact area suppresses the reaction. Namely the narrow contact area interferes with the smooth shift of hydrogen ion between the electrolyte layer and the electrode. The wider contact area, on the other hand, facilitates the reaction and accelerates the smooth shift of hydrogen ion between the electrolyte layer and the electrode. In the fuel cell of the above application, the first contact area, where the electrolyte layer is in contact with the oxygen electrode, is narrower than the second contact area, where the electrolyte layer is in contact with the hydrogen electrode. This arrangement interferes with the smooth shift of hydrogen ion at the oxygen electrode, so as to raise the hydrogen ion concentration in the second contact area, while accelerating the smooth shift of hydrogen ion at the hydrogen electrode, so as to lower the hydrogen ion concentration in the first contact area. This causes a difference in hydrogen ion concentration between the first contact area and the second contact area and thus enhances the electromotive force, based on the functions discussed above. The effect of the electromotive force enhancement by this arrangement is not so significant, and it is accordingly preferable to combine this arrangement with any of the applications discussed above.

In the case of a polymer electrolyte fuel cell, the technique of the present invention may be attained by a polymer electrolyte membrane included in the fuel cell.

The present invention is accordingly directed to a polymer electrolyte membrane that forms an electrolyte layer of a fuel cell, wherein the fuel cell includes a hydrogen electrode and an oxygen electrode disposed across the electrolyte layer, which hydrogen ion permeates. The electrolyte layer contains an ion exchange group for the hydrogen ions in such a manner that concentration of the ion exchange group in a second contact area, where the electrolyte layer is in contact with the hydrogen electrode, is lower than that in a first contact area, where the electrolyte layer is in contact with the oxygen electrode.

The present invention is further directed to a polymer electrolyte membrane that forms an electrolyte layer of a fuel cell, wherein the fuel cell includes a hydrogen electrode and an oxygen electrode disposed across the electrolyte layer, which hydrogen ion permeates. The electrolyte layer contains a non-proton cation in the vicinity of a contact area, where the electrolyte layer is in contact with the hydrogen electrode.

Application of the polymer electrolyte membrane of this arrangement for the fuel cell causes a difference in hydrogen ion concentration between a contact area of the polymer electrolyte membrane close to the hydrogen electrode and a contact area close to the oxygen electrode, based on the functions discussed above. This desirably enhances the electromotive force. The variety of arrangements utilizing the additional elements discussed above with regard to the fuel cell are also applicable to the polymer electrolyte membrane of the present invention.

These and other objects, features, aspects, and advantages of the present invention will become more apparent from the following detailed description of the preferred embodiments with the accompanying drawings.

DESCRIPTION OF THE PREFERRED EMBODIMENTS (1) First Embodiment

Figure 2:
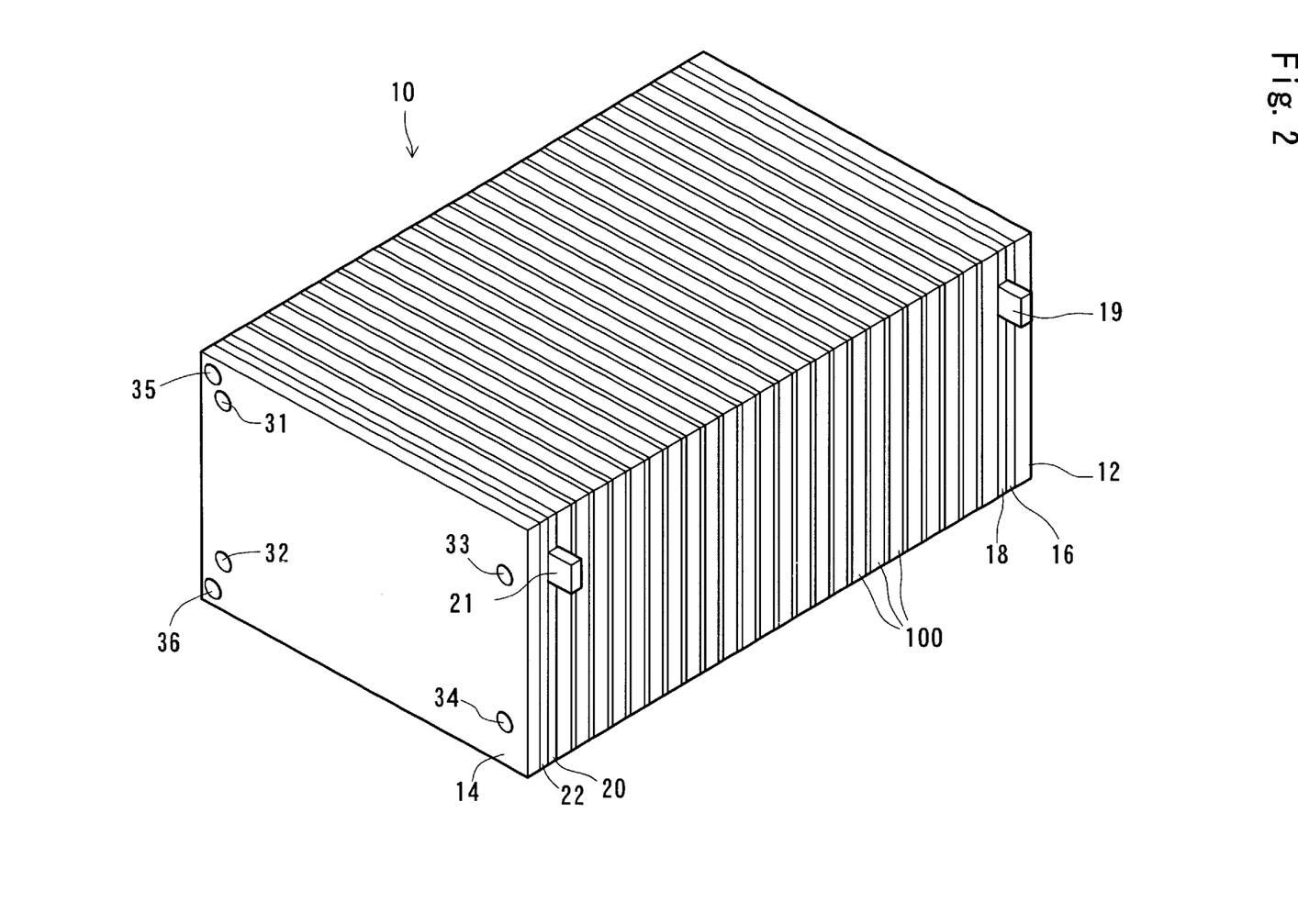
FIG. 2 is a perspective view illustrating the appearance of a stack of fuel cells in a first embodiment according to the present invention.
Figure 3:
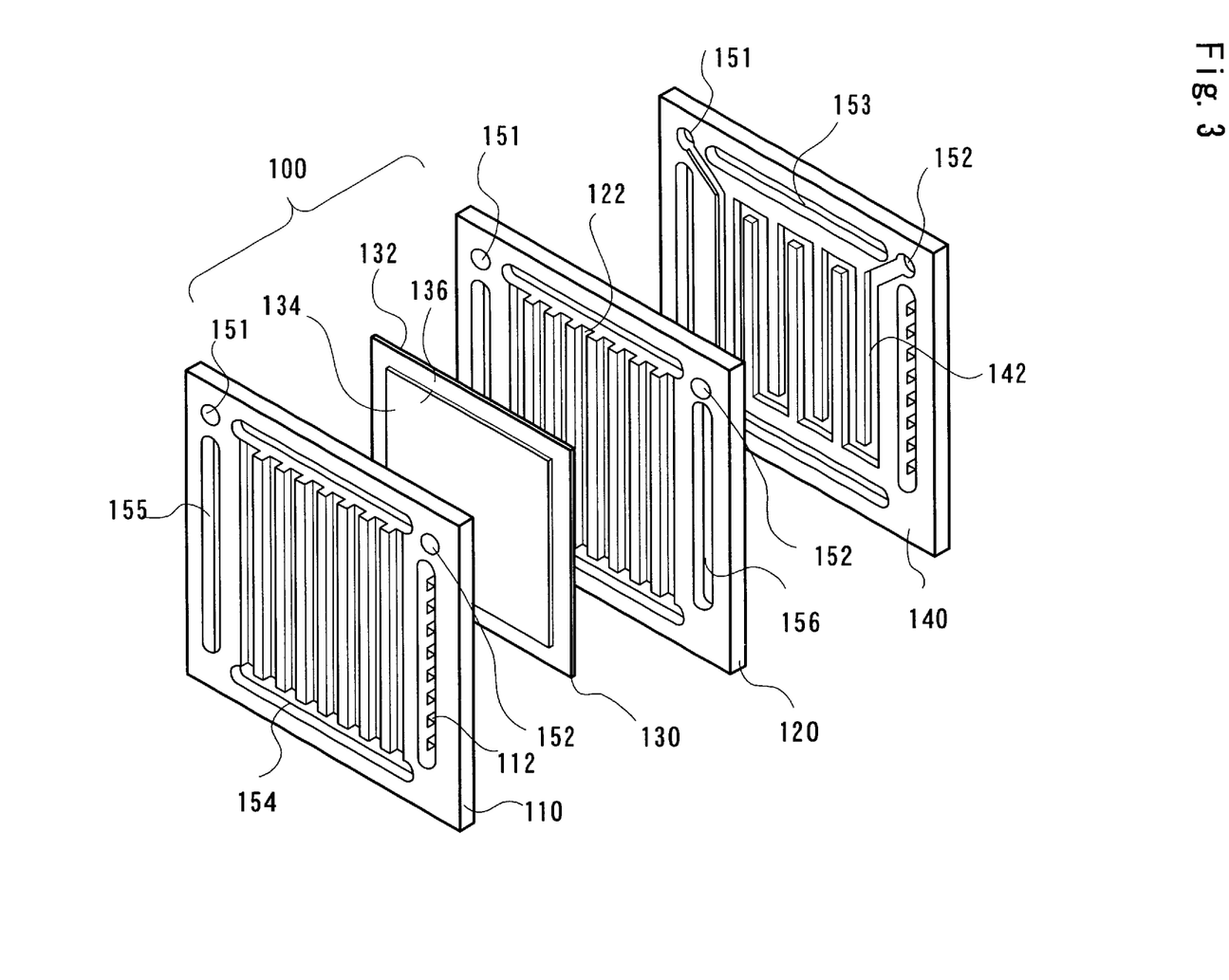
FIG. 3 is a perspective view illustrating the structure of a unit cell, which is a basic element of the fuel cells stack shown in FIG. 1.

FIG. 2 is a perspective view illustrating the appearance of a stack of fuel cells 10 (hereinafter referred to as the fuel cells stack) in a first embodiment according to the present invention. The fuel cells stack 10 is obtained by laying a predetermined number of unit cells 100 one upon another. Each unit cell 100 is constructed as a polymer electrolyte fuel cell and generates an electromotive force of approximately 1V. FIG. 3 is a perspective view illustrating the structure of the unit cell 100. The unit cell 100 includes an oxygen electrode 136, an electrolyte membrane 132, and a hydrogen electrode 134 that are arranged in this sequence and interposed between a pair of separators 110 and 120. In the fuel cells stack 10, the separators 110 and 120 are commonly held by adjoining unit cells 100. The detailed structure of the unit cell 100 will be discussed later.

Referring back to FIG. 2, the fuel cells stack 10 includes an end plate 12, an insulator plate 16, a collector plate 18, a plurality of unit cells 100, another collector plate 20, another insulator plate 22, and another end plate 14, which are arranged and laid one upon another in this sequence. The end plates 12 and 14 are composed of a metal, such as copper, to ensure the sufficient rigidity. The collector plates 18 and 20 are composed of a gas-impermeable conductive material, such as dense carbon or copper plate. The insulator plates 16 and 22 are composed of a dielectric material, such as rubber or resin. The collector plates 18 and 20 respectively have output terminals 19 and 21, from which electric power produced by the fuel cells stack 10 is output.

There are formed in the end plate 14 a gaseous fuel supply port 35, a gaseous fuel discharge port 36, an oxidant gas supply port 33, an oxidant gas discharge port 34, a cooling water supply port 31, and a cooling water discharge port 32. A supply of gaseous fuel fed from the gaseous fuel supply port 35 into the fuel cells stack 10 flows towards the end plate 12 and is distributed to the respective unit cells 100. The gaseous fuel fed to each unit cell 100 flows through an inner flow path of the unit cell 100 from the upper side to the lower side of the drawing, runs towards the end plate 14, and is discharged from the gaseous fuel discharge port 36. In a similar manner, a supply of oxidant gas fed from the oxidant gas supply port 33 flows towards the end plate 12 and is distributed to the respective unit cells 100. The oxidant gas fed to each unit cell 100 flows through an inner flow path of the unit cell 100, runs towards the end plate 14, and is discharged from the oxidant gas discharge port 34. In the fuel cells stack 10, each unit cell 100 has inner gas flow paths to attain such flows of the gases.

Referring again to FIG. 3, the electrolyte membrane 132 included in each unit cell 100 has a sealed circumferential area that is in contact with the separators 110 and 120. The sealing effectively prevents the gaseous fuel and the oxidant gas from leaking from the unit cells 100 and being mixed with each other. The fuel cells stack 10 is clamped and held with bolts and nuts under a predetermined pressing force applied in the direction of the stacking, although they are omitted from the illustration. The bolts and the nuts are, however, not essential elements to hold the layers under the application of the pressing force. For example, a casing for accommodating the fuel cells stack 10 may be used instead.

The respective unit cells 100 are constructed as polymer electrolyte fuel cells. Each unit cell 100 includes the hydrogen electrode 134 and the oxygen electrode 136 that are arranged across the electrolyte membrane 132 and interposed between the pair of separators 110 and 120. The oxygen electrode 136 is hidden behind the electrolyte membrane 132 in the illustration of FIG. 3. Both the hydrogen electrode 134 and the oxygen electrode 136 are gas diffusion electrodes. The separators 110 and 120 have a number of groove-forming ribs formed in the faces respectively facing the hydrogen electrode 134 and the oxygen electrode 136. The arrangement of interposing the hydrogen electrode 134 and the oxygen electrode 136 between the pair of separators 110 and 120 causes a gaseous fuel flow path 112 to be defined by the separator 110 and the hydrogen electrode 134 and an oxidant gas flow path 122 to be defined by the separator 120 and the oxygen electrode 136. Each of the separators 110 and 120 has the number of ribs formed on both the faces thereof and is combined on one face thereof with the hydrogen electrode 134 of one unit cell 100 to define the gaseous fuel flow path 112 therebetween and on the other face thereof with the oxygen electrode 136 of an adjoining unit cell 100 to define the oxidant gas flow path 122 therebetween. The separators 110 and 120 are combined with the gas diffusion electrodes to define the gas flow paths therebetween, while functioning to separate the flow of the gaseous fuel from the flow of the oxidant gas in the adjoining unit cells 100.

The electrolyte membrane 132 is a proton-conductive ion-exchange membrane composed of a polymer material, for example, a fluororesin, and has a favorable electrical conductivity in the wet state. For example, a Nafion membrane (manufactured by du Pont) is applicable for the electrolyte membrane 132. Platinum functioning as a catalyst is applied on the respective faces of the electrolyte membrane 132. The application of the catalyst is executed by; dispersing carbon powder with platinum as the catalyst carried thereon into an organic solvent, adding an adequate quantity of an electrolytic solution (for example, Nafion solution manufactured by Aldrich Chemical Corp.) to the dispersion to yield a paste, and screen-printing the paste on the electrolyte membrane 132. A variety of other methods may be applicable for the formation of the catalyst layer. One available method forms a paste containing carbon powder with the catalyst carried thereon to sheets and presses the sheets on the respective faces of the electrolyte membrane 132. An alloy of platinum and another metal may be used as the catalyst. The hydrogen electrode 134 and the oxygen electrode 136 are made of carbon cloth, which is woven from carbon fibers. Carbon paper or carbon felt composed of carbon fibers may alternatively be applied for the hydrogen electrode 134 and the oxygen electrode 136. The catalyst is required to be present between the gas diffusion electrode and the electrolyte membrane 132. The catalyst may thus be applied on the respective contact faces of the hydrogen electrode 134 and the oxygen electrode 136 that are in contact with the electrolyte membrane 132, instead of being applied on the respective faces of the electrode membrane 132.

The separators 110 and 120 are composed of a gas-impermeable conductive material, for example, gas-impermeable dense carbon obtained by compressing carbon. Each of the separators 110 and 120 has a number of ribs that are formed on both faces thereof and arranged in parallel. It is not necessary that the ribs are formed in parallel on both the faces of the separator. The ribs formed on each face may have a predetermined angle to the ribs formed on an adjoining face. In this embodiment, for example, the ribs formed on each alternate face are perpendicular to the ribs formed on each adjoining face. As long as the ribs can form the flow paths of the gaseous fuel and the oxidant gas, ribs may have any shape other than that forming the parallel grooves.

Each of the separators 110 and 120 has a pair of cooling water apertures 151 and 152 that are formed at two different positions in a peripheral portion of the separator and have a circular cross section. When the unit cells 100 are laid one upon another, the cooling water apertures 152 and 152 form a cooling water flow path that passes through the fuel cells stack 10 in the direction of the stacking of the unit cells 100. Each of the separators 110 and 120 also has a pair of gaseous fuel slots 153 and 154 and a pair of oxidant gas slots 155 and 156 that respectively extend along the respective sides of the separator. When the number of unit cells 100 are laid one upon another to provide the fuel cells stack 10, the gaseous fuel slots 153 and 154 and the oxidant gas slots 155 and 156 respectively form the gaseous fuel flow path 112 and the oxidant gas flow path 122 that pass through the fuel cells stack 10 in the direction of the stacking of the unit cells 100. In the fuel cells stack 10 of the embodiment, a gaseous fuel supply path is formed along the upper side of the separators 110 and 120 shown in FIG. 3, whereas a gaseous fuel exhaust path is formed along the lower side thereof. In a similar manner, an oxidant gas supply path is formed along the left side of the separators 110 and 120, whereas an oxidant gas exhaust path is formed along the right side thereof.

The gaseous fuel supply port 35 of the fuel cells stack 10 (FIG. 2) connects with the gaseous fuel supply path, and the gaseous fuel discharge port 36 connects with the gaseous fuel exhaust path. A supply of gaseous fuel fed from the gaseous fuel supply port 35 runs through the gaseous fuel supply path and flows into the gaseous fuel flow path 112 of the respective unit cells 100. The gaseous fuel is subjected to the specified reaction on the hydrogen electrode 134 and subsequently flows through the gaseous fuel exhaust path to be discharged from the gaseous fuel discharge port 36. The oxidant gas flows in a similar manner. The oxidant gas supply port 33 of the fuel cells stack 10 connects with the oxidant gas supply path, and the oxidant gas discharge port 34 connects with the oxidant gas exhaust path. A supply of oxidant gas fed from the oxidant gas supply port 33 runs through the oxidant gas supply path and flows into the oxidant gas flow path 122 of the respective unit cells 100. The oxidant gas is subjected to the specified reaction on the oxygen electrode 136 and subsequently flows through the oxidant gas exhaust path to be discharged from the oxidant gas discharge port 34.

The fuel cells stack 10 also includes cooling separators 140, which are arranged at every five unit cells 100. The cooling separators 140 define a cooling water flow path, which cooling water for cooling down the unit cells 100 flows through. Each cooling separator 140 has a serpentine cooling water groove 142 that connects the cooling water apertures 151 and 152 with each other. Each of the separators 110 and 120 that faces the cooling separator 140 has a flat surface without any ribs on the side facing the cooling separator 140. The serpentine cooling water groove formed in the cooling separator 140 in combination with the facing separator 110 or 120 defines the cooling water flow path. The separators 110 and 120 and the cooling separator 140 may be composed of any of various conductive materials other than the dense carbon. For example, for the better rigidity and heat transfer, a metal, such as a copper alloy or an aluminum alloy, may be applied for the material of the separators 110 and 120 and the cooling separator 140. The rate of the number of the cooling separators 140 to the number of the unit cells 100 may be set in a certain range that ensures sufficient cooling effects, based on various conditions, such as the quantity of heat produced by each unit cell 100 according to the required output from the fuel cells stack 10 and the temperature and the flow of cooling water.

Figure 4:
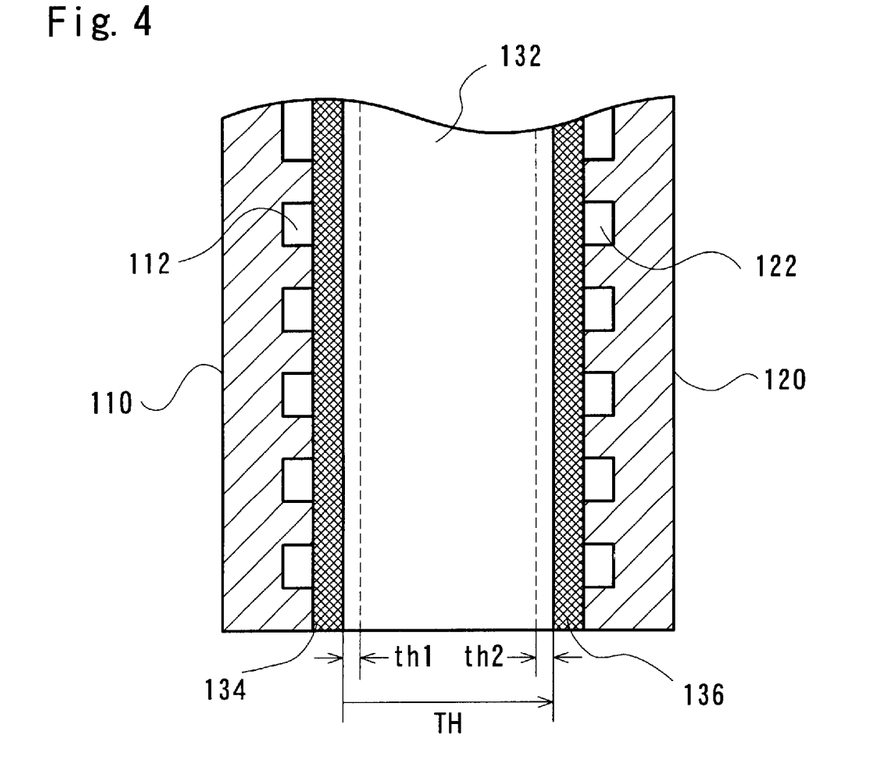
FIG. 4 is an enlarged sectional view illustrating the structure of the unit cell.

The especially prominent characteristic of this embodiment is the composition of the electrolyte membrane 132 included in each unit cell 100. The composition of the electrolyte membrane 132 is discussed below in detail. FIG. 4 is an enlarged sectional view illustrating the structure of the unit cell 100. As described previously, each unit cell 100 has the hydrogen electrode 134 and the oxygen electrode 136 that are arranged across the electrolyte membrane 132 and interposed between the pair of separators 110 and 120. For the clarity of illustration and description, it is here assumed that both the gaseous fuel flow path 112 and the oxidant gas flow path 122 are formed in a direction perpendicular to the drawing sheet.

As mentioned above, the electrolyte membrane 132 is composed of a sulfonic acid-containing fluororesin. The fluororesin contains the sulfonic acid group as the ion exchange group. The electrolyte membrane 132 has a thickness TH of several tens of micrometers ($\mu$m). In the fuel cells stack 10 of this embodiment, the concentration of the sulfonic acid group in the electrolyte membrane 132 varies in the direction of the thickness.

Figure 5:
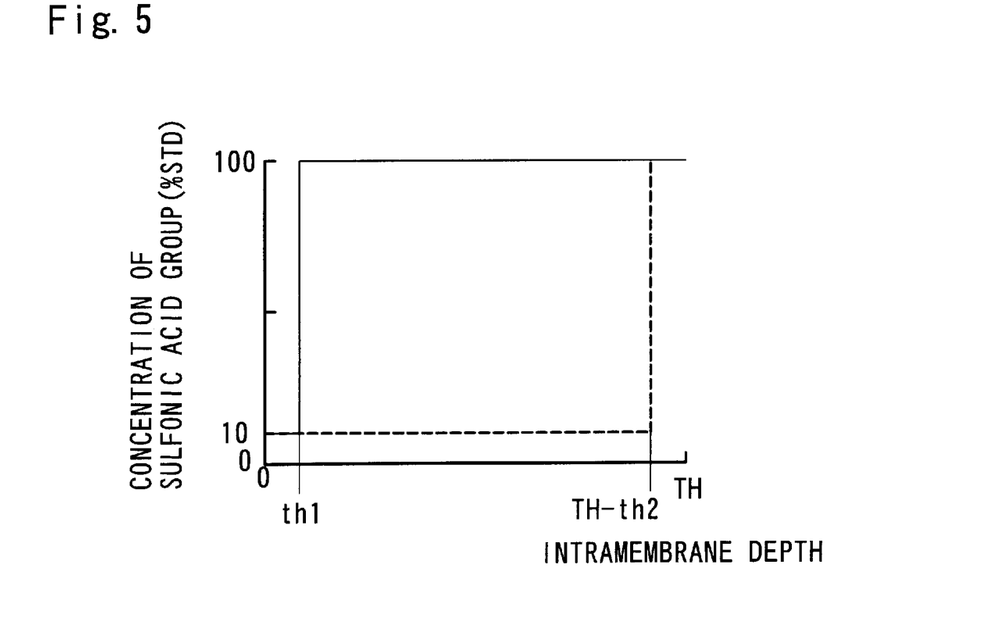
FIG. 5 is a graph showing distributions of the sulfonic acid group in the electrolyte membrane shown in FIG. 4.

FIG. 5 is a graph showing distributions of the sulfonic acid group in the electrolyte membrane 132. The solid line represents a distribution in this embodiment. The abscissa of the graph of FIG. 5 specifies a coordinate representing a position in the direction of the thickness of the electrolyte membrane 132 from the hydrogen electrode 134 to the oxygen electrode 136, that is, an intramembrane depth as defined in FIG. 4. The concentration of the sulfonic acid group is shown against each position along the coordinate axis of the intramembrane depth. More specifically, the ordinate represents the ratio of the observed concentration of the sulfonic acid group to a reference concentration. The reference concentration denotes the concentration of the sulfonic acid group in the vicinity of a contact surface of the electrolyte membrane 132 that is in contact with the oxygen electrode 136.

As shown by the solid line in the graph of FIG. 5, the concentration of the sulfonic acid group in the electrolyte membrane 132 drops in the surface area of a thickness th1 that is in contact with the hydrogen electrode 134. More specifically, the concentration of the sulfonic acid group in this area is about one tenth of the reference concentration. The thickness th1 is approximately equal to 1 $\mu$m. The concentration of the sulfonic acid group is equal to the reference concentration in the other area whose intramembrane depth ranges from th1 to TH. In this embodiment, the electrolyte membrane 132 is prepared by joining two separate sulfonic acid-containing fluororesin membranes having different contents of the sulfonic acid group with each other at the interface of the thickness th1.

The process of preparing the electrolyte membrane 132 is discussed more in detail. The membrane of the sulfonic acid-containing fluororesin is obtained by copolymerization and hydrolysis of its monomers, that is, tetrafluoroethylene and perfluorovinyl ether containing fluorosulfonic group. The concentration of the sulfonic acid group in the membrane is regulated by varying the quantities of the monomers and the degree of polymerization.

An ion exchange membrane containing a predetermined concentration of the sulfonic acid group is prepared by the following procedure. The procedure first mixes certain quantities of the monomers, that is, tetrafluoroethylene and perfluorovinyl ether, corresponding to the predetermined concentration with stirring, copolymerizes the monomers, forms a thin film of the copolymer by an appropriate thin film-forming method, for example, the calendar roll method, and causes the thin film to be subjected to hydrolysis. This techniques gives an ion exchange membrane having a concentration of the sulfonic acid group on the side of the hydrogen electrode 134 and another ion exchange membrane having another concentration of the sulfonic acid group on the side of the oxygen electrode 136.

The two ion exchange membranes prepared separately in the above manner are hot pressed across a mixed solution of the above monomers that is applied on respective one faces of the ion exchange membranes. The hot press makes the copolymerization of the mixed solution proceed and thereby joins the two ion exchange membranes with each other to provide the electrolyte membrane 132 of this embodiment. The preparation of the electrolyte membrane 132 is not restricted to this technique.

The following describes the function of the fuel cells stack 10 of this embodiment, as well as the effects of the lowered concentration of the sulfonic acid group on the side of the hydrogen electrode 134. When a supply of gaseous fuel is fed to the fuel cells stack 10, the gaseous fuel flows through the gaseous fuel flow path 112 shown in FIG. 4 and diffuses into the hydrogen electrode 134. The gaseous fuel is a hydrogen-rich gas. When the gaseous fuel diffuses into the hydrogen electrode 134, the molecule of hydrogen included in the gaseous fuel is decomposed to the hydrogen ion and the electron by the function of the catalyst provided on the boundary between the hydrogen electrode 134 and the electrolyte membrane 132. This reaction is expressed by Equation (1) shown above in the description of the related art. The electron thus produced passes through the separators 110 and 120 on the side of the hydrogen electrode 134 and flows out of the collector electrode of the fuel cells stack 10. The hydrogen ion moves through the electrolyte membrane 132 towards the oxygen electrode 136.

When a supply of oxidant gas is fed to the fuel cells stack 10, on the other hand, the oxidant gas flows through the oxidant gas flow path 122 shown in FIG. 4 and diffuses into the oxygen electrode 136. The oxidant gas is an oxygen-containing gas. When the oxidant gas diffuses into the oxygen electrode 136, the hydrogen ion moving through the electrolyte membrane 132 is combined with oxygen by the means of the function provided on the boundary between the oxygen electrode 136 and the electrolyte membrane 132 and takes the electron in to produce the molecule of water. This reaction is expressed by Equation (2) shown above in the description of the related art. The electron required for this reaction is supplied from the outside via the collector electrode of the fuel cells stack 10 and the separators 110 and 120 on the side of the oxygen electrode 136. Formation of a circuit connecting the hydrogen electrode 134 with the oxygen electrode 136 ensures the continuous release and supply of the electron and enables the electromotive force to be generated between the hydrogen electrode 134 and the oxygen electrode 136, so as to cause the electric current while the supplies of the gaseous fuel and the oxidant gas continue.

The electromotive force generated by the reactions is equal to the potential difference between the hydrogen electrode 134 and the oxygen electrode 136, on which the respective reactions discussed above proceed. In general, there is a certain energy difference between the state of molecules and ions before and after a chemical reaction. The energy difference determines the potential on each electrode. The total energy difference occurring at each electrode is proportional to the quantities of the molecules and ions involved in the reaction. As is well known, in the reversible reactions like the reactions of Equations (1) and (2), the concentration of each molecule or ion in the equilibrium state depends upon the equilibrium constant of the reaction. In the reactions of Equations (1) and (2), determining the concentration of the hydrogen ion defines the equilibrium state at each electrode and determines the potential on each electrode.

It is known that the potential due to the reaction occurring at each electrode of the fuel cell is determined by the theoretical equation called the Nernst equation. The Nernst equation is given above as Equations (3) and (4). According to Equations (3) and (4), the electrode potential is proportional to the hydrogen ion concentration. The lower hydrogen ion concentration results in the lower potential. In the case where the hydrogen ion concentration is expressed by pH, the greater pH value results in the lower potential. The relationship between the pH and the electrode potential is shown in the graph of FIG. 1. As long as the pH is identical at the two electrodes, the electromotive force (corresponding to the voltage V1 in FIG. 1) is fixed and theoretically equal to 1.23 V.

In the electrolyte membrane 132 of the embodiment, the section on the side of the hydrogen electrode 134 has the lower concentration of the sulfonic acid group than that in the section on the side of the oxygen electrode 136. As is known in the art, the sulfonic acid group functions to move the hydrogen ion in the electrolyte membrane 132. Because of this function of the sulfonic acid group, the hydrogen ion concentration in the electrolyte membrane 132 depends upon the concentration of the sulfonic acid group. In the area having a large number of sulfonic acid groups, a large number of hydrogen ions are accordingly present. In the fuel cells stack 10 of this embodiment, the lower concentration of the ion exchange group in the contact area of the electrolyte membrane 132 that is in contact with the hydrogen electrode 134 results in the lower hydrogen ion concentration on the side of the hydrogen electrode 134 than that on the side of the oxygen electrode 136. Namely the hydrogen electrode 134 has a greater pH value. Referring to the graph of FIG. 1, when the pH value at the oxygen electrode 136 is equal to pHo, the pH value at the hydrogen electrode 134 is equal to pHh. The electromotive force of each unit cell 100 here corresponds to the potential difference V2 between the two electrodes. In the fuel cells stack 10 of this embodiment, the higher pH value at the hydrogen electrode 134 than that at the oxygen electrode 136 enhances the electromotive force of each unit cell 100.

The equilibrium state of the reaction occurring at each electrode depends upon the hydrogen ion concentration in the contact area, where the electrode is in contact with the electrolyte membrane 132. As discussed above with the graph of FIG. 5, a decrease of the hydrogen ion concentration in a relatively small depth of the electrolyte membrane 132 close to the hydrogen electrode 134 sufficiently enhances the electromotive force. An increase of the intramembrane depth th1 shown in FIG. 4, on the contrary, hardly contributes to the enhancement of the electromotive force. It is, however, not necessary to make the concentration of the sulfonic acid group coincident with the reference concentration in the area having the intramembrane depth of greater than th1 from the hydrogen electrode 134. The concentration of the sulfonic acid group in the electrolyte membrane 132 may be increased towards the oxygen electrode 136 gradually or in a stepwise manner.

The difference in pH between the two electrodes does not mean that there is any difference between the number of hydrogen ions involved in the reactions occurring on the respective electrodes. The reactions proceed according to Equations (1) and (2) given above to cause the electric current, so that the equivalent number of hydrogen ions is involved in the reactions occurring on the respective electrodes. For example, when the reaction occurring on the hydrogen electrode 134 gives a number A of hydrogen ions, the number A of hydrogen ions move through the electrolyte membrane 132 and are subjected to the reaction occurring on the oxygen electrode 136. In the event that there is a pH difference between the two electrodes, the reaction at the hydrogen electrode 134 proceeds in the circumstance of a less number of hydrogen ions, whereas the reaction at the oxygen electrode 136 proceeds in the circumstance of a greater number of hydrogen ions.

The enhancement of the electromotive force is attributed to the lower pH value at the hydrogen electrode 134 relative to the pH value at the oxygen electrode 136. In the example discussed above, the concentration of the sulfonic acid group is lowered in the vicinity of the hydrogen electrode 134. Alternatively the concentration of the sulfonic acid group may be raised in the vicinity of the oxygen electrode 136. A distribution of the sulfonic acid group in the latter case is shown by the broken line in FIG. 5. In this case, in the surface area of a thickness th2 that is in contact with the oxygen electrode 136, the concentration of the sulfonic acid group may be raised to be about ten times the concentration in the residual area.

The pH difference between the hydrogen electrode 134 and the oxygen electrode 136 may be set according to the target electromotive force. Under the condition that the concentration of the sulfonic acid group on the side of the hydrogen electrode 134 is one tenth of the concentration on the side of the oxygen electrode 136, the potential at the hydrogen electrode 134 is enhanced by 20 to 50 mV. The difference in concentration of the sulfonic acid group between the two electrodes will be increased for the greater target electromotive force. In the case of the sulfonic acid-containing fluororesin, the increase in concentration of the sulfonic acid group generally lowers the mechanical strength of the resin and thereby deteriorates the durability of the fuel cells. The decrease in concentration of the sulfonic acid group, on the contrary, interferes with the movement of the hydrogen ion, thereby increasing the internal resistance. It is accordingly desirable to set appropriate values to the concentration of the sulfonic acid group on the respective electrodes while comprehensively taking into account the target electromotive force, the mechanical strength, and the internal resistance. Under the condition of this embodiment, the decrease in concentration of the sulfonic acid group on the side of the hydrogen electrode 134 slightly increases the internal resistance. When the electric current was flown at the current density of about 100 to 200 $mA/cm^2$, however, the enhancement of the electromotive force by 10 to 30 mV was measured against the above loss.

The arrangement of this embodiment discussed above effectively enhances the electromotive force of each unit cell 100. This favorably decreases the number of unit cells 100 included in the fuel cells stack 10 to attain the required output voltage, and thereby reduces the size and the manufacturing cost of the fuel cells stack 10.

(2) Second Embodiment

The following describes fuel cells in a second embodiment according to the present invention. The fundamental structure of the fuel cells stack 10 of the second embodiment is identical with that of the first embodiment. The difference from the first embodiment is the structure of a unit cell 100, more specifically the structure of an electrolyte membrane 132.

Figure 6:
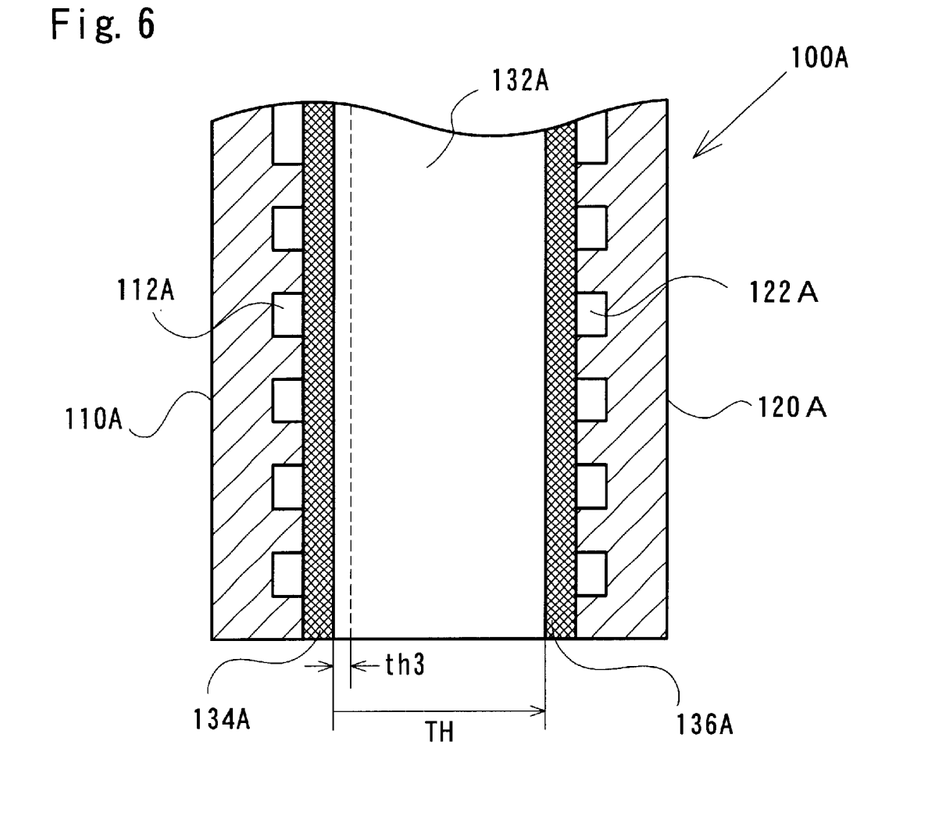
FIG. 6 is an enlarged sectional view illustrating the structure of another unit cell in a second embodiment according to the present invention.

FIG. 6 is an enlarged sectional view illustrating the structure of the unit cell 100A in the second embodiment. Like the unit cell 100 of the first embodiment, the unit cell 100A of the second embodiment has a hydrogen electrode 134A and an oxygen electrode 136A, which are arranged across an electrolyte membrane 132A and interposed between a pair of separators 110A and 120A. For the clarity of illustration and description, it is here assumed that both a gaseous fuel flow path 112A and an oxidant gas flow path 122A are formed in a direction perpendicular to the drawing sheet. Like the electrolyte membrane 132 of the first embodiment, the electrolyte membrane 132A of the second embodiment is composed of a sulfonic acid-containing fluororesin, contains the sulfonic acid group as the ion exchange group, and has a thickness TH of several tens of micrometers. The differences from the first embodiment are that the electrolyte membrane 132A of the second embodiment has a fixed concentration of the sulfonic acid group and that the electrolyte membrane 132A contains sodium ion in an area close to the hydrogen electrode 134A.

Figure 7:
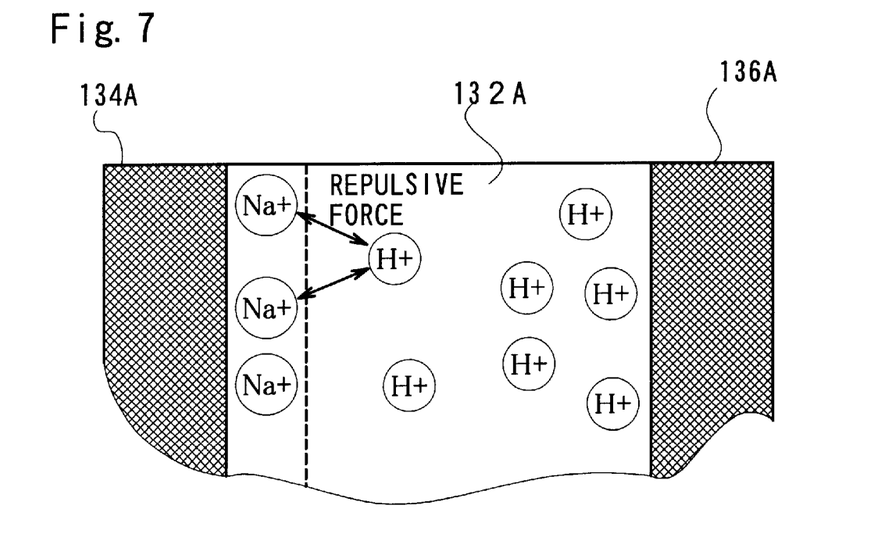
FIG. 7 is an enlarged sectional view illustrating an electrolyte membrane of the second embodiment.

FIG. 7 is an enlarged sectional view illustrating the electrolyte membrane 132A of the second embodiment. The electrolyte membrane 132A contains sodium ion in the surface area of an intramembrane thickness th3 that is in contact with the hydrogen electrode 134A. In the second embodiment, the electrolyte membrane 132A is obtained by joining an ion exchange membrane of the thickness th3 containing sodium ion with an ion exchange membrane that is free of sodium ion.

A diversity of methods are applicable to prepare the ion exchange membrane containing sodium ion. A method similar to the procedure of application of the catalyst is adopted in this embodiment. The method provides a membrane of the sulfonic acid-containing fluororesin by mixing a solution of sodium nitrate with the material monomers and causing the mixture to be subjected to the copolymerization and hydrolysis. The method subsequently heats the resulting membrane to remove the nitrate ion. The sodium ion accordingly remains in the membrane. The ion exchange membrane containing sodium ion is then joined with another ion exchange membrane that is free of sodium ion in the same manner as the first embodiment. This gives the electrolyte membrane 132A of the second embodiment. The preparation of the electrolyte membrane 132A is, however, not restricted to this technique.

The electrolyte membrane 132A of the second embodiment has the functions discussed below. The reactions discussed in the first embodiment proceed in each of the unit cells 110A. The hydrogen ion produced at the hydrogen electrode 134A moves through the electrolyte membrane 132A towards the oxygen electrode 136A. In the electrolyte membrane 132A of the second embodiment, an electrical repulsive force works between the hydrogen ion and the sodium ion. The repulsive force causes the hydrogen ion to localize in the section of the electrolyte membrane 132A close to the oxygen electrode 136A. The localization results in a difference in hydrogen ion concentration between the hydrogen electrode 134A and the oxygen electrode 136A. Namely the hydrogen ion concentration decreases on the side of the hydrogen electrode 134A and increases on the side of the oxygen electrode 136A. The difference in hydrogen ion concentration between the two electrodes enhances the electromotive force as discussed in the first embodiment.

Although the electrolyte membrane 132A contains sodium ion, any of a variety of other non-proton cations, such as potassium ion, calcium ion, silver ion, or another metal cation, may, however, be added to the electrolyte membrane 132A in place of or in addition to the sodium ion. The content of the non-proton cation is set appropriately according to the target electromotive force.

Like the first embodiment, the arrangement of the second embodiment effectively enhances the electromotive force of the unit cell 100A. The addition of the cation to the section of the electrolyte membrane 132A on the side of the hydrogen electrode 134A raises the potential at the hydrogen electrode 134A by approximately 80 to 100 mV. The degree of the potential rise depends upon the type and the quantity of the cation added. The fuel cells stack 10 of the second embodiment has the enhanced electromotive force without varying the concentration of the sulfonic acid group. This arrangement ensures the enhanced electromotive force while avoiding the potential problem due to the varying concentration of the sulfonic acid group, that is, the lowered mechanical strength or the raised internal resistance of the electrolyte membrane 132A.

(3) Third Embodiment

The following describes fuel cells in a third embodiment according to the present invention. The fundamental structure of the fuel cells stack 10 of the third embodiment is identical with that of the first embodiment. The difference from the first embodiment is the structure of a unit cell 100, more specifically the structure of an electrolyte membrane 132.

Figure 8:
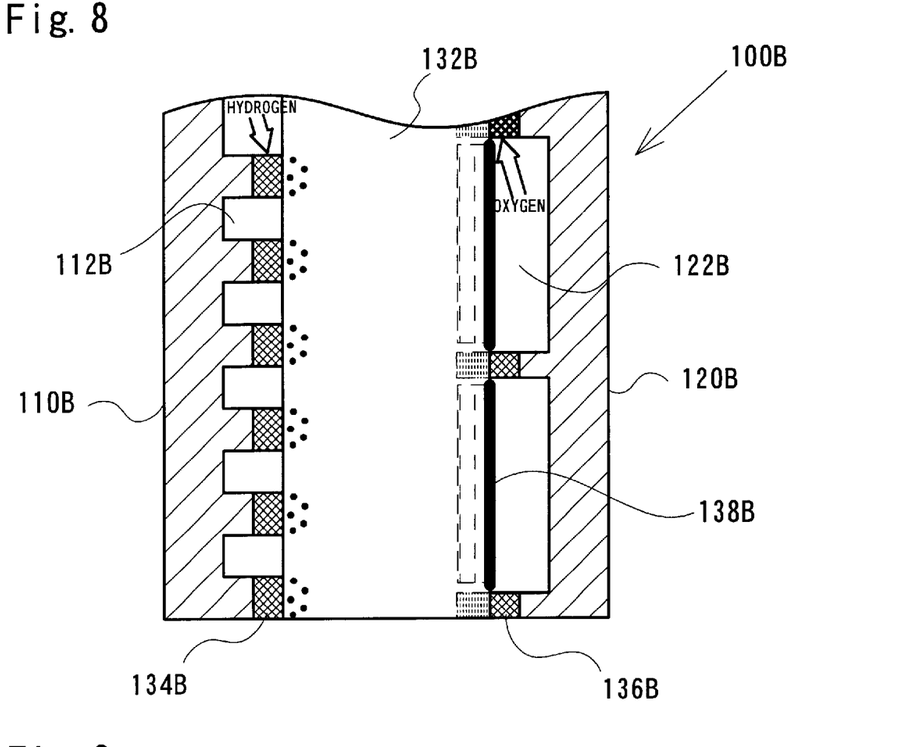
FIG. 8 is an enlarged sectional view illustrating the structure of still another unit cell in a third embodiment according to the present invention.

FIG. 8 is an enlarged sectional view illustrating the structure of the unit cell 100B in the third embodiment. Like the unit cell 100 of the first embodiment, the unit cell 100B of the third embodiment has a hydrogen electrode 134B and an oxygen electrode 136B, which are arranged across an electrolyte membrane 132B and interposed between a pair of separators 110B and 120B. For the clarity of illustration and description, it is here assumed that both a gaseous fuel flow path 112B and an oxidant gas flow path 122B are formed in a direction perpendicular to the drawing sheet. Like the electrolyte membrane 132 of the first embodiment, the electrolyte membrane 132B of the second embodiment is composed of a sulfonic acid-containing fluororesin, contains the sulfonic acid group as the ion exchange group, and has a thickness TH of several tens of micrometers.

Unlike the first embodiment, the hydrogen electrode 134B and the oxygen electrode 136B of the third embodiment are placed intermittently on top of the ribs of the separators 110B and 120B. In the unit cell 100 of the first embodiment, the respective electrodes 134 and 136 are in contact with the whole faces of the electrolyte membrane 132. In the unit cell 100B of the third embodiment, on the other hand, both the hydrogen electrode 134B and the oxygen electrode 136B are in contact with only partial faces of the electrolyte membrane 132B at the positions of the ribs of the separators 110B and 120B. The catalyst is also applied only in the contact areas of the electrolyte membrane 132B that are in contact with the respective electrodes 134B and 136B. The presence of the gaseous fuel flow path 112B and the oxidant gas flow path 122B causes even the non-contact areas of the electrolyte membrane 132B to be exposed to the supplies of the gaseous fuel and the oxidant gas. There is, however, no catalyst in the non-contact areas, so that the reactions do not proceed in such areas. The reactions accordingly proceed only at the hydrogen electrode 134B and the oxygen electrode 136B that are partly in contact with the electrolyte membrane 132B.

In the unit cell 100B of the third embodiment, the shape of each separator 110B or 120B on the side of the hydrogen electrode 134B is different from that on the side of the oxygen electrode 136B. As clearly shown in FIG. 8, the separator 110B on the side of the hydrogen electrode 134B has a greater number of ribs, each having a greater area, than the separator 120B on the side of the oxygen electrode 136B. This causes the contact area of the electrolyte membrane 132B that is in contact with the hydrogen electrode 134B to be greater than the contact area of the electrolyte membrane 132B that is in contact with the oxygen electrode 136B.

The electrolyte membrane 132B of the third embodiment also has the structure different from that of the electrolyte membrane 132 of the first embodiment. The first difference is that the section of the electrolyte membrane 132B in the vicinity of the hydrogen electrode 134B contains sodium ion, like the second embodiment. The black spots in FIG. 8 represent the sodium ion. In this example, the sodium ion localizes in the contact areas of the electrolyte membrane 132B that are in contact with the hydrogen electrode 134B. The electrolyte membrane 132B may alternatively have a layer containing sodium ion, like the electrolyte membrane 132A of the second embodiment.

The second difference is that the concentration of the sulfonic acid is raised in the contact areas of the electrolyte membrane 132B that are in contact with the oxygen electrode 136B and lowered in the non-contact areas of the electrolyte membrane 132B in the vicinity of the oxygen electrode 136B. Either one of the rise and the drop of the concentration may be applied to attain the concentration difference of the sulfonic acid group. For example, the concentration of the sulfonic acid group in the non-contact areas of the electrolyte membrane 132B in the vicinity of the oxygen electrode 136B may be kept equivalent to the concentration in the residual section of the electrolyte membrane 132B, whereas the concentration of the sulfonic acid group in the contact areas of the electrolyte membrane 132B is increased. In another example, the concentration of the sulfonic acid group in the contact areas of the electrolyte membrane 132B in the vicinity of the oxygen electrode 136B may be kept equivalent to the concentration in the residual section of the electrolyte membrane 132B, whereas the concentration of the sulfonic acid group in the non-contact areas of the electrolyte membrane 132B is decreased.

The third difference is that a water repellent layer 138B is formed on the surface of the non-contact areas of the electrolyte membrane 132B on the side of the oxygen electrode 136B. The water repellent layer 138B is obtained by applying a film of fluorosilicone on the surface of the non-contact areas. The water repellent layer 138B is a thin film of approximately several hundreds of nanometers to 1 micrometer in thickness. The water repellent layer 138B may be obtained alternatively by coating the surface of the non-contact areas with such a film. The water repellent layer 138B is not restricted to the film of fluorosilicone, but other fluoro compounds and any other suitable materials may be applied for the water repellent layer 138B.

The fuel cells stack 10 of the third embodiment has the functions discussed below. The presence of the non-proton cation on the side of the hydrogen electrode 134B enhances the electromotive force of the unit cell 100B of the third embodiment by the mechanism discussed in the second embodiment. The concentration of the sulfonic acid group in the contact areas of the electrolyte membrane 132B that are in contact with the oxygen electrode 136B is relatively higher than the concentration in the non-contact areas. The hydrogen ions shifted towards the oxygen electrode 136B accordingly are distributed differently in the contact areas and in the non-contact areas. This results in the higher hydrogen ion concentration in the contact areas. By the mechanism discussed in the first embodiment, the uneven distribution of hydrogen ions enhances the electromotive force.

Figure 9:
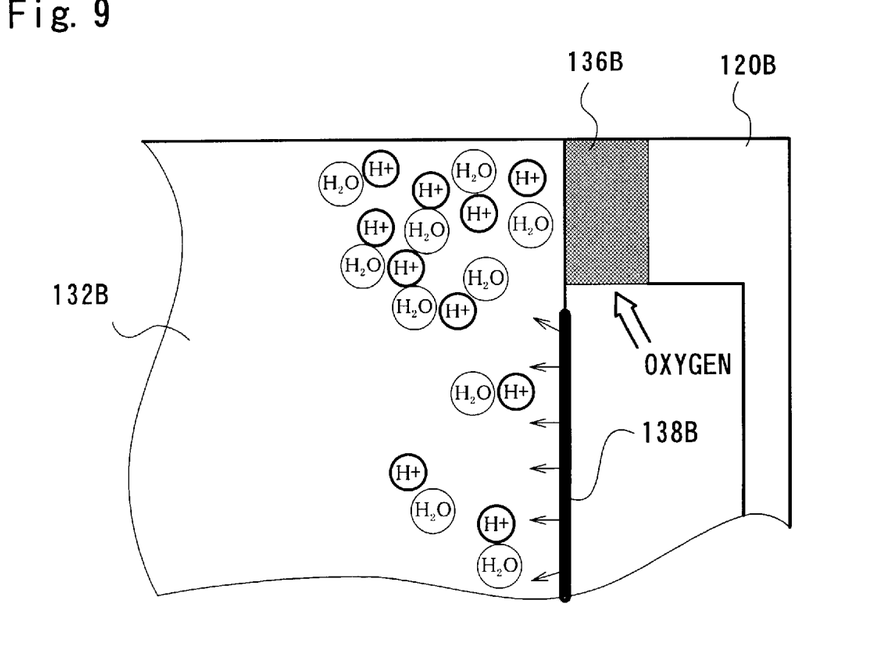
FIG. 9 shows the function of a water repellent layer formed in the unit cell shown in FIG. 8.

In the unit cell 100 of the third embodiment, the water repellent layer 138B also contributes to the enhancement of the electromotive force. FIG. 9 is an enlarged view showing the vicinity of the oxygen electrode 136B to explain the function of the water repellent layer 138B. The water repellent layer 138B works to keep the water molecules away from the non-contact areas in the electrolyte membrane 132B, so that the water molecules localize in the contact areas. As mentioned previously, the hydrogen ion is generally combined with water molecules to form the hydroxonium ion $(xH_2O)H^+$ and shifts in the electrolyte membrane 132B. As shown in FIG. 9, a large number of hydrogen ions shifted towards the oxygen electrode 136B accordingly localize in the contact areas of the electrolyte membrane 132B that are in contact with the oxygen electrode 136B and where a large number of water molecules are present. This results in increase of the hydrogen ion concentration in the contact areas. By the mechanism discussed in the first embodiment, the increased hydrogen ion concentration enhances the electromotive force of the unit cell 100B.

In the unit cell 100B of the third embodiment, the difference in total contact area between the hydrogen electrode 134B and the oxygen electrode 136B also contributes to the enhancement of the electromotive force. As mentioned previously, in the unit cell 100B of the third embodiment, the total contact area of the electrolyte membrane 132B that is in contact with the hydrogen electrode 134B is greater than the total contact area of the electrolyte membrane 132B that is in contact with the oxygen electrode 136B. In this embodiment, the total contact area of the electrolyte membrane 132B with the hydrogen electrode 134B is approximately five times the total contact area with the oxygen electrode 136B. The contact resistance between each electrode and the electrolyte membrane 132B is practically proportional to the total contact area. The greater total contact area with the hydrogen electrode 134B accordingly accelerates the movement of the hydrogen ion from the hydrogen electrode 134B into the electrolyte membrane 132B. This arrangement facilitates the movement of the hydrogen ion from the hydrogen electrode 132B to the electrolyte membrane 132B and ensures the quick diffusion of the hydrogen ion into the electrolyte membrane 132B. On the contrary, this arrangement suppresses the movement of the hydrogen ion from the electrolyte membrane 132B to the oxygen electrode 136B. The hydrogen ion accordingly localizes in the section of the electrolyte membrane 132B in the vicinity of the oxygen electrode 136B. This results in the difference in hydrogen ion concentration between the hydrogen electrode 134B and the oxygen electrode 136B. The hydrogen ion concentration thus decreases on the side of the hydrogen electrode 134B, while increasing on the side of the oxygen electrode 136B. By the mechanism discussed in the first embodiment, the varying hydrogen ion concentration enhances the electromotive force.

The ratio of the total contact area of the electrolyte membrane 132B with the hydrogen electrode 134B to the total contact area with the oxygen electrode 136B is not restricted to the above value, but may be set arbitrarily in the range of 2:1 to 10:1. Appropriate values may be set to the total contact areas while taking into account the target electromotive force and the mechanical strengths of the separators 110B and 120B and the respective electrodes 134B and 136B.

Because of the characteristics discussed above, the unit cell 100B of the third embodiment has the electromotive force enhanced by approximately 100 to 150 mV. The unit cell 100B of the third embodiment has the several characteristics which contribute to the enhanced electromotive force. All these characteristics may, however, not be simultaneously adopted in the unit cell, but one or some of them may be adopted individually. For example, in the unit cell 100B of the third embodiment, sodium ion is locally added to the contact areas of the electrolyte membrane 132B that are in contact with the hydrogen electrode 134B. In one possible modification, the addition of the sodium ion is omitted. In this case, the expected enhancement of the electromotive force is about 90 to 130 mV. No addition of the cation makes the section of the electrolyte membrane 132B on the side of the hydrogen electrode 134B to have a homogeneous composition. This simplifies the structure of the unit cell 100B and ensures the stable operation of the fuel cells stack 10 over a long time period of greater than 10,000 hours.

In the structure of the unit cell 100B of the third embodiment, there is a difference in total contact area of the electrolyte membrane 132B between on the side of the hydrogen electrode 134B and on the side of the oxygen electrode 136B. In one possible modification, the total contact area may be identical on the sides of the respective electrodes. On the side of the oxygen electrode 136B, the concentration of the sulfonic acid group in the contact areas of the electrolyte membrane 132B is made different from the concentration in the non-contact areas. In one possible modification, the concentration of the sulfonic acid group may be identical in both the contact areas and the non-contact areas. The concentration of the sulfonic acid group in the electrolyte membrane 132B on the side of the hydrogen electrode 134B may also be identical with the concentration on the side of the oxygen electrode 136B. The various characteristics of the third embodiment may individually be applied while comprehensively taking into account the target electromotive force, the manufacturing cost, and the other related factors.

In the unit cell 100B of the third embodiment, the water repellent layer 138B is formed on the non-contact areas of the electrolyte membrane 132B on the side of the oxygen electrode 136B. The water repellent layer 138B is formed rather easily with a high accuracy and thus readily enhances the electromotive force of the unit cell 100B. The water repellent layer 138B is formed separately after the formation of the electrolyte membrane 132B. This does not require any complicated step in the process of forming the electrolyte membrane 132B. As discussed above, the unit cell 100B of the third embodiment has several features to enhance the electromotive force. It is, however, not necessary to adopt all these characteristics simultaneously, but one or some of them may be applied individually. In one possible modification, the formation of the water repellent layer 138B is omitted.

The water repellent layer 138B may be replaced by another structure having the equivalent effects. In the unit cell 100B of the third embodiment, the water repellent layer 138B is provided to obtain uneven distribution of water molecules. Any structure other than the water repellent layer 138B may be adopted to fulfil the similar effects. For example, a hydrophilic layer may be formed on the contact areas of the electrolyte membrane 132B that are in contact with the oxygen electrode 136B. In another example, the water repellent layer 138B may be formed on the contact areas of the electrolyte membrane 132B that are in contact with the hydrogen electrode 134B. A hydrophilic layer may alternatively be formed on the non-contact areas of the electrolyte membrane 132B on the side of the hydrogen electrode 134B. Any of these techniques may be combined according to the requirements. Although any of these techniques is applicable, the formation of the water repellent layer 138B on the non-contact areas of the electrolyte membrane 132B on the side of the oxygen electrode 136B adopted in the third embodiment has the advantage of no interference with the electrode reaction on the contact areas.

Although the above embodiments are described about the polymer electrolyte fuel cells, the present invention is, however, not restricted to the polymer electrolyte fuel cells, but is also applicable to other fuel cells, such as phosphoric acid fuel cells, molten carbonate fuel cells, solid oxide fuel cells, and alkali fuel cells. For example, in the case of the liquid electrolyte like the phosphoric acid fuel cells, a porous membrane is formed in the liquid electrolyte and the hydrogen ion concentration of the porous membrane will be set different between the two electrodes. In the polymer electrolyte fuel cells of the above embodiments, the electrolyte membrane is composed of the fluororesin containing the sulfonic acid group as the ion exchange group. The composition of the electrolyte membrane and the ion exchange group are, however, not restricted to these embodiments. Any other group, for example, the phosphoric acid group, may be used as the ion exchange group. The present invention is also directed to the polymer electrolyte membrane itself included in the polymer electrolyte fuel cells.

The present invention is not restricted to the above embodiments or their modifications, but there may be many other modifications, changes, and alterations without departing from the scope or spirit of the main characteristics of the present invention. The scope and spirit of the present invention are limited only by the terms of the appended claims.

What is claimed is:

1. A fuel cell comprising:

a hydrogen electrode;

an oxygen electrode; and an electrolyte layer inserted between said hydrogen electrode and said oxygen electrode, having a first contact area in contact with said oxygen electrode and a second contact area in contact with said hydrogen electrode, wherein said electrolyte layer includes a hydrogen ion exchange membrane comprising a solid polymer, and said electrolyte layer includes a non-proton cation, wherein the concentration of the non-proton cation in the vicinity of the second contact area is higher than the concentration of the non-proton cation in the vicinity of the first contact area such that the first contact area has a higher concentration of hydrogen ions than the second contact area.

2. A fuel cell in accordance with claim 1, wherein said electrolyte layer contains an ion exchange group, and the first contact area has higher concentration of the ion exchange group than the second contact area.

3. A fuel cell in accordance with claim 2, wherein said electrolyte layer comprises a hydrogen ion exchange membrane, which is mainly composed of a perfluorocarbon polymer containing a sulfonic acid group as the ion exchange group.

4. A fuel cell in accordance with claim 1, wherein the first contact area is narrower than the second contact area.

5. A fuel cell in accordance with claim 4, wherein the ratio of the first contact area to the second contact area is in the range of 2:1 to 10:1.

6. A fuel cell in accordance with claim 1 wherein the first contact area does not contain the non-proton cation.

7. A fuel cell comprising:

a hydrogen electrode;

an oxygen electrode;

an electrolyte layer inserted between said hydrogen electrode and said oxygen electrode, said electrolyte layer being constructed and arranged to allow hydrogen ions to permeate, said electrolyte layer having a first contact area contacting with said oxygen electrode and a second contact area contacting with said hydrogen electrode; and enhancement means that enhances hydrogen ion concentration at the first contact area to be higher than the hydrogen ion concentration at the second contact area.

8. A fuel cell in accordance with claim 7, wherein said electrolyte layer comprises a hydrogen ion exchange membrane, which is mainly composed of a solid polymer, at least one of said hydrogen electrode and said oxygen electrode has ribs and grooves between the ribs, the ribs being in contact with at least one of opposite faces of said electrolyte layer such that the at least one of opposite faces of said electrolyte layer has a non-contact layer which is not in contact with said at least one of said hydrogen electrode and said oxygen electrode; and said enhancement means causes a difference in hydrogen ion conductivity between the non-contact area and the contact area adjacent to said non-contact area at said at least one of said hydrogen electrode and said oxygen electrode.

9. A fuel cell in accordance with claim 8, wherein said oxygen electrode has the ribs and the grooves, and said enhancement means is a water repellent layer provided on surface of the non-contact region in said electrolyte layer.

10. A fuel cell in accordance with claim 7, wherein the first contact area is narrower than the second contact area.

11. A fuel cell in accordance with claim 10, wherein the ratio of the first contact area to the second contact area is in the range of 2:1 to 10:1.

12. A fuel cell comprising:

a hydrogen electrode; and an electrolyte layer inserted between and in contact with, said hydrogen electrode and said oxygen electrode, including a hydrogen ion exchange membrane comprising of a solid polymer, wherein a concentration of an ion exchange group is higher in areas in contact with said oxygen electrode than in areas not in contact with said oxygen electrode.

* * * * *

UNITED STATES PATENT AND TRADEMARK OFFICE
CERTIFICATE OF CORRECTION

PATENT NO.    : 6,436,566 B1
DATED         : August 20, 2002
INVENTOR(S)   : Kyoichi Tange It is certified that error appears in the above-identified patent and that said Letters Patent is hereby corrected as shown below:

Column 24,
Line 4, claim 12 should read:
12.    A fuel cell comprising:
       a hydrogen electrode;
       an oxygen electrode; and
       an electrolyte layer inserted between and in contact with, said hydrogen electrode and said oxygen electrode, including a hydrogen ion exchange membrane comprising of a solid polymer, wherein a concentration of an ion exchange group is higher in area in contact with said oxygen electrode than in areas not in contact with said oxygen electrode.

Signed and Sealed this

Eighteenth Day of October, 2005

JON W. DUDAS
*Director of the United States Patent and Trademark Office*